(12) United States Patent
Kiribayashi

(10) Patent No.: US 8,180,520 B2
(45) Date of Patent: May 15, 2012

(54) ELECTRONIC SAFING SYSTEM

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 449 days.

(21) Appl. No.: 12/590,171

(22) Filed: Nov. 3, 2009

(65) Prior Publication Data

US 2010/0121521 A1 May 13, 2010

(30) Foreign Application Priority Data

Nov. 11, 2008 (JP) ................................. 2008-289031

(51) Int. Cl.
*G06F 7/00* (2006.01)

(52) U.S. Cl. ............. 701/31.1; 701/45; 701/46; 701/47; 280/735; 361/248

(58) Field of Classification Search ................ 701/31.1, 701/45, 46, 47, 48; 280/735; 361/248
See application file for complete search history.

(56) References Cited

U.S. PATENT DOCUMENTS

| | | | | |
|---|---|---|---|---|
| 5,164,901 A * | 11/1992 | Blackburn et al. | ............... | 701/47 |
| 5,317,512 A * | 5/1994 | Ota et al. | ......................... | 701/46 |
| 5,624,132 A * | 4/1997 | Blackburn et al. | ............ | 280/735 |
| 5,672,917 A * | 9/1997 | Nakano | .......................... | 307/116 |
| 6,095,554 A * | 8/2000 | Foo et al. | ....................... | 280/735 |
| 6,249,730 B1 * | 6/2001 | Khairallah et al. | ............ | 701/45 |
| 7,089,099 B2 * | 8/2006 | Shostak et al. | ............... | 701/29.6 |
| 7,103,460 B1 * | 9/2006 | Breed | .......................... | 701/32.9 |
| 7,154,733 B2 * | 12/2006 | Sibrai | ............................ | 361/248 |
| 7,273,229 B2 * | 9/2007 | Miura | ............................ | 280/735 |
| 7,434,835 B2 * | 10/2008 | Shimizu | ........................ | 280/735 |
| 7,481,453 B2 * | 1/2009 | Breed | ............................ | 280/738 |
| 7,635,043 B2 * | 12/2009 | Breed | ............................ | 180/282 |
| 7,739,012 B2 * | 6/2010 | Komaki et al. | .................. | 701/45 |
| 7,832,762 B2 * | 11/2010 | Breed | ............................ | 280/735 |
| 7,875,994 B2 * | 1/2011 | Hattori et al. | ................ | 307/10.1 |
| 2001/0009337 A1 * | 7/2001 | Ueno et al. | .................... | 307/10.1 |
| 2002/0067175 A1 * | 6/2002 | Kiribayashi et al. | .......... | 324/713 |
| 2004/0036261 A1 * | 2/2004 | Breed | ............................ | 280/735 |

(Continued)

FOREIGN PATENT DOCUMENTS

JP 6-40307 2/1994

(Continued)

OTHER PUBLICATIONS

Office action dated Aug. 24, 2010 in corresponding Japanese Application No. 2008-289031.

*Primary Examiner* — Thomas G. Black
*Assistant Examiner* — Wae Louie
(74) *Attorney, Agent, or Firm* — Harness, Dickey & Pierce, PLC

(57) ABSTRACT

The electronic safing system is provided with a safing sensor, a comparator, and a microcomputer. The microcomputer has a programmable analog I/O port which is connected to a built-in AD-DA converter. The programmable analog I/O port can be switched to an analog input port and an analog output port according to an internal register. The programmable analog I/O port is connected to an input terminal of the comparator. When diagnosing the comparing circuit, the microcomputer switches the programmable analog I/O port to the analog output port and outputs a predetermined voltage for diagnosis. Then, the microcomputer diagnoses the comparing circuit by monitoring the output of the comparing circuit.

8 Claims, 2 Drawing Sheets

U.S. PATENT DOCUMENTS

| | | | |
|---|---|---|---|
| 2004/0160045 A1* | 8/2004 | Miura | 280/735 |
| 2004/0164744 A1 | 8/2004 | Koga et al. | |
| 2004/0174649 A1* | 9/2004 | Ito | 361/91.1 |
| 2005/0187685 A1* | 8/2005 | Kondo et al. | 701/45 |
| 2005/0192727 A1* | 9/2005 | Shostak et al. | 701/37 |
| 2005/0225925 A1* | 10/2005 | Sibrai | 361/247 |
| 2006/0025897 A1* | 2/2006 | Shostak et al. | 701/1 |
| 2006/0232052 A1* | 10/2006 | Breed | 280/735 |
| 2007/0055429 A1* | 3/2007 | Komaki et al. | 701/45 |
| 2007/0228703 A1* | 10/2007 | Breed | 280/735 |
| 2008/0082237 A1* | 4/2008 | Breed | 701/45 |
| 2008/0136151 A1* | 6/2008 | Hattori et al. | 280/735 |
| 2008/0147280 A1* | 6/2008 | Breed | 701/46 |
| 2008/0243342 A1* | 10/2008 | Breed | 701/45 |
| 2010/0121521 A1* | 5/2010 | Kiribayashi | 701/31 |

FOREIGN PATENT DOCUMENTS

| | | |
|---|---|---|
| JP | 8-94695 | 4/1996 |
| JP | 08-207698 | 8/1996 |
| JP | 10-21111 | 1/1998 |
| JP | 2001-206191 | 7/2001 |
| JP | 2002-33740 | 1/2002 |
| JP | 2002-55114 | 2/2002 |
| JP | 2002-166820 | 6/2002 |
| JP | 2003-248022 | 9/2003 |
| JP | 2004-243955 | 9/2004 |
| JP | 2004-268632 | 9/2004 |

* cited by examiner

ELECTRONIC SAFING SYSTEM

CROSS REFERENCE TO RELATED APPLICATION

This application is based on Japanese Patent Application No. 2008-289031 filed on Nov. 11, 2008, the contents of which are incorporated herein by reference in its entirety.

FIELD OF THE INVENTION

The present invention relates to an electronic safing system.

BACKGROUND OF THE INVENTION

An electronic safing system includes a verifying system which verifies conditions of a detecting component for detecting an event on a vehicle. For example, the electronic safing system verifies a detecting circuit by supplying a signal which imitates a detecting signal of a sensor and by monitoring an output from the detecting circuit to determine whether the output signal is an expected signal or not.

Conventionally, an air bag system disclosed in the document US Patent Application Publication 2004/0160045A1 (JP-2004-243955A) is known as an apparatus which uses the electronic safing system. The air bag system includes a first acceleration sensor, a second acceleration sensor, a comparator, a microcomputer, and an integrated IC. The acceleration sensor may be called as an impact sensor or a gravitational sensor. The acceleration sensors may be also called as a G sensor. The first G sensor and the second G sensor detect the acceleration of vehicle, and output the analog signals according to detected accelerations. The first G sensor is connected to an A/D converter of a microcomputer. The second G sensor is connected to the comparator. The comparator outputs the digital signal corresponding to a comparison result which is obtained by comparing the analog signal from the second G sensor and a reference voltage. The digital signal from the comparator is connected and inputted to the digital port of the microcomputer. The digital port may be called as a digital input pin. The microcomputer determines whether an air bag shall be deployed or not based on the analog signal from the first G sensor and the digital signal from the comparator. Then, the integrated IC initiates the air bag to deploy in response to a signal from the microcomputer which is obtained based on the determination result. In this system, the first G sensor provides a main system which may be called as a primary system. The second G sensor provides a sub-system which may be called as a secondary system. In one example, the microcomputer only initiates the air bag when both the first G sensor and the second G sensor detect certain level of impact acceleration indicating a collision of the vehicle.

SUMMARY OF THE INVENTION

In order to improve the reliability, the air bag system usually performs an on-board diagnosis. The on-board diagnosis diagnoses several parts of a circuit after the system is turned on. For example, as shown in FIG. 2, in a case that the reference voltage is set by a voltage divider circuit A, the reference voltage is changed by changing a voltage dividing ratio by using the resistance R1 and a switching element SW1. Then, the device diagnoses the comparator CP1 by monitoring the output of the comparator CP1 which is expected to be responsive to the reference voltage intentionally changed. However, a circuit B for changing the voltage dividing ratio is necessary. Therefore, a circuit configuration is complicated and needs a higher cost.

The present invention is made in view of such a problem, and is made to address such a problem.

It is an object of the present invention to provide an improved electronic safing system.

It is another object of the present invention to provide an electronic safing system which enables a diagnosis with simple configuration.

It is a still another object of the present invention to provide an electronic safing system which enables a diagnosis with low cost.

According to the present invention, an electronic safing system comprises a safing sensor which detects a physical quantity responsive to a collision of a vehicle and outputs a voltage signal according to a detected result. The electronic safing system further comprises a comparing circuit which compares the voltage signal from the safing sensor with a reference voltage and outputs a signal corresponding to the comparison result, and a microcomputer which determines whether a collision occurs or not based on the output voltage of the safing sensor and the output of the comparing circuit. The safing sensor has an output terminal which is connected to an input terminal of the comparing circuit. The microcomputer has a programmable analog I/O port which is connected to a built-in AD-DA converter and can be switched to an analog input port and an analog output port in a selectable manner according to an internal register. The programmable analog I/O port is connected with the input terminal of the comparing circuit. The microcomputer switches the programmable analog I/O port to the analog output port and outputs a predetermined voltage when diagnosing the comparing circuit, and diagnoses the comparing circuit by monitoring the output of the comparing circuit. According to the present invention, a diagnosis for the comparing circuit can be performed by using the programmable analog I/O port equipped on the micro computer. Therefore, it is possible to perform the diagnosis for the comparing circuit with simple circuit configuration. It is possible to eliminate additional circuit components which are assembled for the diagnosis purpose only. In addition, it is possible to reduce cost.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

An embodiment of the present invention is explained in detail while referring to the attached drawings.

Figure 1:
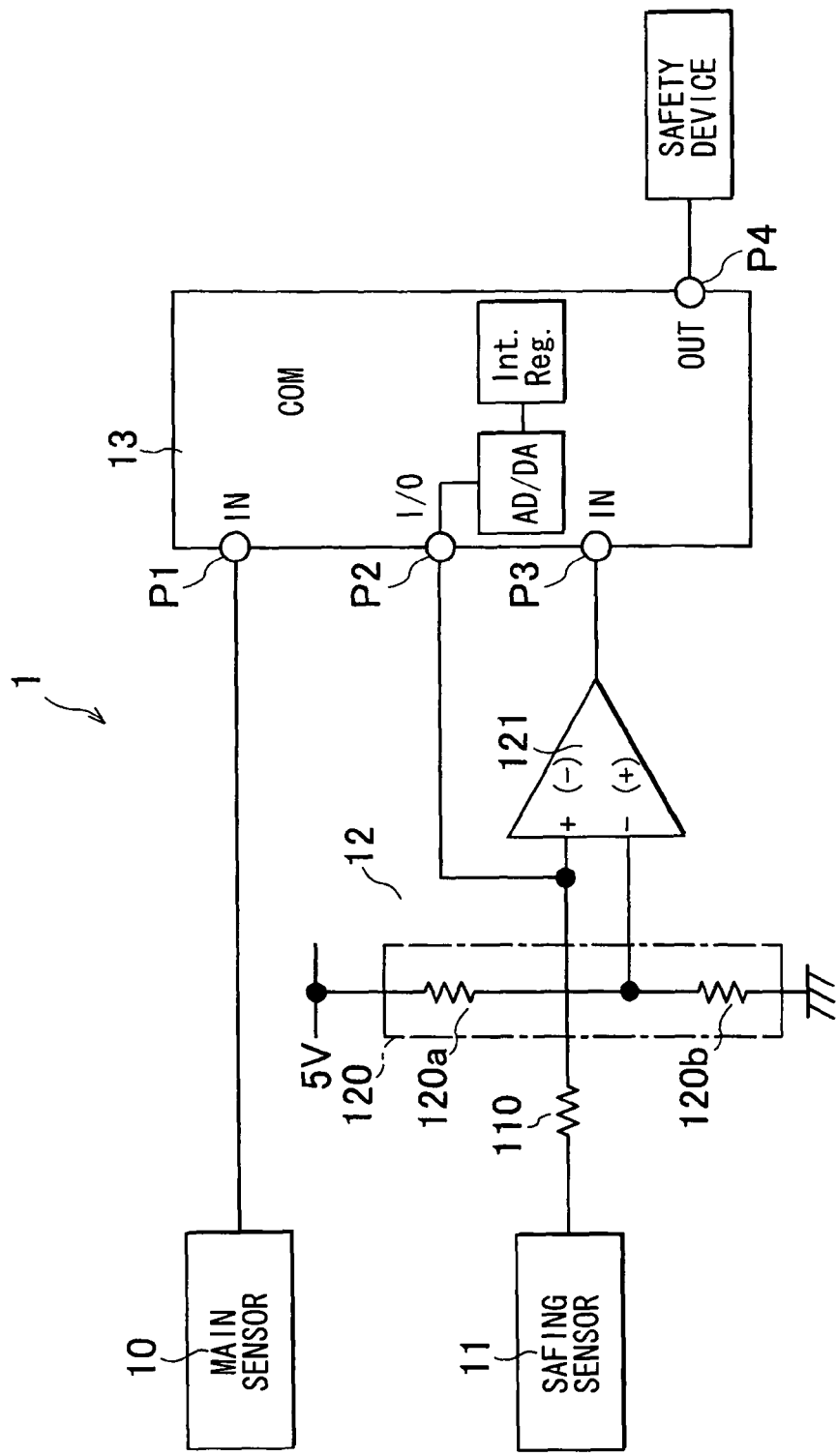
FIG. 1 is a block diagram, showing a circuit configuration, of a electronic safing system according to an embodiment of the present invention.
Figure 2:
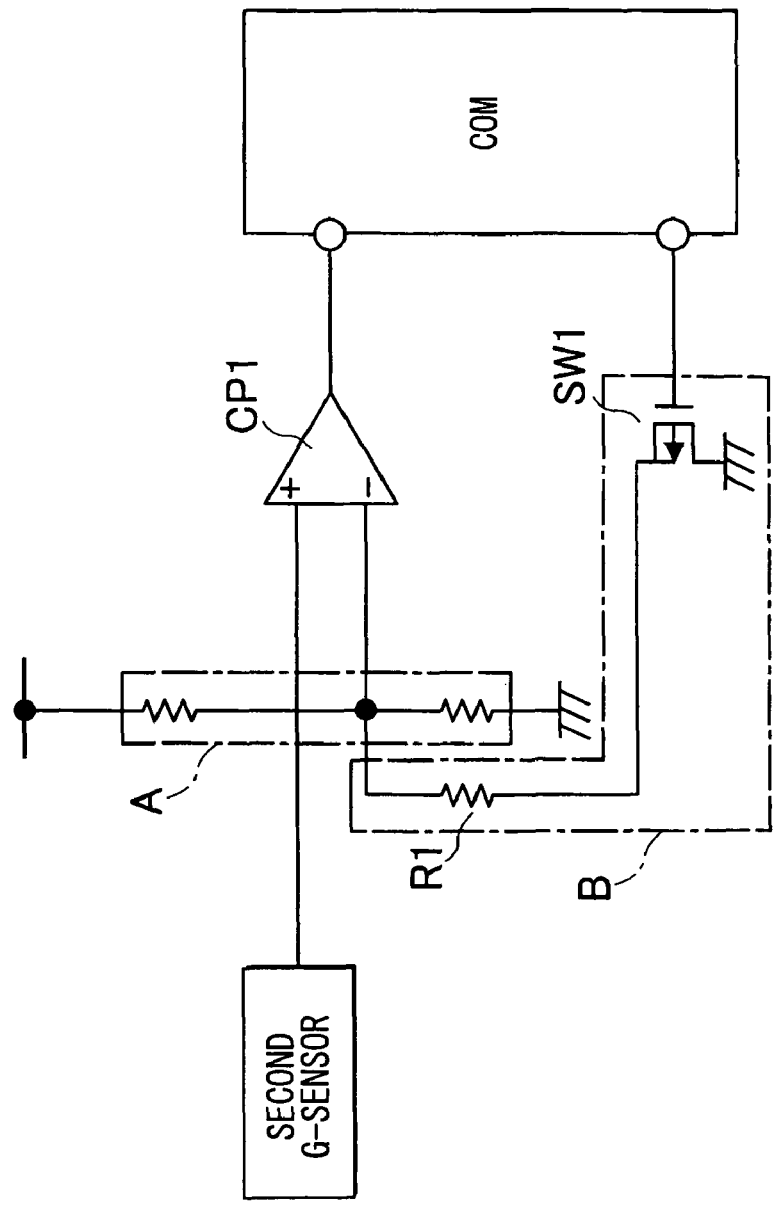
FIG. 2 is a block diagram showing a circuit configuration of a peripheral circuit of a comparator in a conventional air bag system.

FIG. 1 shows a block diagram of an electronic safing system 1 according to the embodiment.

The electronic safing system includes a microcomputer which provides a verifying device. The verifying device verifies conditions of a circuit for processing an output signal from a sensor for detecting an event on a vehicle. The verifying device supplies a signal which imitates the signal of the sensor to the circuit while inhibiting a sensor responsive function of the system. The verifying device monitors an output from the circuit to determine whether the output is an expected signal or not. The electronic safing system may be called as a de-arming system for a vehicle occupant protection device. The system may include a main sensor and a sub sensor both of which detect the same event on the vehicle in the same or different ways. The sub sensor and its circuit are used for improving the reliability of a main sensor system. The vehicle occupant protection system can be initiated only when both the sensor system detect the event. The verifying device is installed on at least one line for the main and sub sensors. The verifying device may be installed on a line for the sub sensor. The electronic safing system outputs a signal to an apparatus on the vehicle if both the sensors detect the event. In one example, the electronic safing system outputs an initiating signal to a safety device on the vehicle.

The electronic safing system 1 is mounted on a vehicle. The electronic safing system 1 is a device which supplies an initiating signal to an initiating circuit of a safety device on the vehicle in response to a detection of a collision of the vehicle. The safety device may be an occupant crash protection device, such as an air bag device. The electronic safing system 1 includes a main sensor 10, a safing sensor 11, a comparing circuit 12, and a microcomputer 13.

The main sensor 10 is a sensor which is mounted in an electronic control unit. The electronic control unit is a circuit unit contained in a case mounted on the vehicle. The main sensor 10 detects acceleration on the vehicle which changes in response to a collision of the vehicle with an object. The main sensor 10 outputs a voltage signal according to a detection result, a detected acceleration. The main sensor 10 is activated by being supplied with a source voltage of 5V. The main sensor 10 outputs 2.5V when no acceleration is detected. The main sensor 10 varies the voltage from 2.5V in accordance with an acceleration detected. For example, the voltage signal is increased from 2.5V when a positive acceleration is detected. The output terminal of the main sensor 10 is connected to the microcomputer 13.

The safing sensor 11 is activated by being supplied with a source voltage of 5V. The safing sensor 11 outputs 2.5V when no acceleration is detected. The safing sensor 11 varies the voltage from 2.5V in accordance with an acceleration detected. For example, the voltage signal is increased from 2.5V when a positive acceleration is detected. The output terminal of the safing sensor 11 is connected to the comparing circuit 12 via the protective resistor 110. The protective resistor 110 provides a connection between the output terminal of the safing sensor 11 and the input terminal of the comparing circuit 12.

The comparing circuit 12 is a circuit which compares the output voltage from the safing sensor 11 with a reference voltage determined inside the electronic safing system, and outputs a signal according to a comparison result. The comparing circuit 12 is activated by being supplied with a source voltage of 5V and outputs the signal according to the comparison result. For example, the comparing circuit 12 outputs a first signal when the output voltage of the safing sensor 11 reaches to a certain level which is indicative of a collision of the vehicle. The comparing circuit 12 includes a voltage dividing circuit 120 and a comparator 121.

The voltage dividing circuit 120 is a circuit which sets the predetermined reference voltage. The voltage dividing circuit 120 is made of resistors 120a and 120b. The resistors 120a and 120b are connected in series to provide a series circuit. One end of the series circuit including the resistors 120a and 120b is connected to a regulated voltage of 5V which is a power source for the circuit. The other end of the series circuit is grounded. A connection point between the resistors 120a and 120b is connected to an input terminal of the comparator 121. The resistances of the resistors 120a and 120b are set so that the voltage of the connection point connected to the comparator 121 becomes the reference voltage which is higher than 2.5V. Here, the reference voltage is voltage which serves as a threshold value for determining whether a collision between a vehicle and an object occurs or not based on the output voltage of the safing sensor 11.

The comparator 121 is a single packaged circuit device which compares the output voltage of the safing sensor 11 with the reference voltage from the voltage dividing circuit 120 and outputs a signal according to the comparison result. The comparator 121 is an operational amplifier which is activated by being supplied with a source voltage of 5V. The comparator 121 is operated certainly to an inlet voltage close to 0V or 5V. The comparator 121 includes an inverting input terminal, a non-inverting input terminal and an output terminal. The comparator 121 includes the inverting input terminal connected to one of connection points between two of the plurality of resistors 120a and 120b. The comparator 121 includes the non-inverting input terminal which is provided as the input terminal of the comparing circuit 12. The non-inverting input terminal of the comparator 121 is connected to the safing sensor 11 via a protective resistor 110 and also connected to the microcomputer 13. The comparator 121 includes the output terminal which is provided as the output terminal of the comparing circuit 12. The output terminal of the comparator 121 is connected to the microcomputer 13.

The microcomputer 13 is an element which determines whether a collision of the vehicle and an object occurs or not. The microcomputer 13 determines a collision based on an output voltage from the main sensor 10, the output voltage of the safing sensor 11, and the output of the comparator 121. The microcomputer 13 outputs an initiating signal to the safety device. The microcomputer 13 is activated by being supplied with a source voltage of 5V. The microcomputer 13 performs a diagnosis for the comparing circuit 12 within several seconds immediately after the source voltage of 5V is turned on. In the diagnosis, if the microcomputer 13 determines that the comparing circuit 12 is in a normal condition, the microcomputer 13 shifts its function mode from a diagnosis mode to a collision determining mode. In the collision determining mode, the microcomputer 13 outputs control signals, e.g., the initiating signal, in response to the determination result. On the other hand, if the microcomputer 13 determines that the comparing circuit 12 is in an abnormal condition, the microcomputer 13 reports the abnormality, e.g., a failure of the comparing circuit 12, by turning on a warning lamp on an instrument panel of the vehicle.

The microcomputer 13 is provided with at least an analog input port P1, a programmable analog I/O port P2, a digital input port P3, and a digital output port P4. The analog input port P1 is a port which can only be inputted. The analog input port P1 is connected to a built-in AD converter. The programmable analog I/O port P2 is connected to a built-in AD-DA converter. The programmable analog I/O port P2 can be switched to an analog input port and an analog output port in a selectable manner according to an internal register of the microcomputer 13. The digital input port P3 is a port which inputs a digital signal. The digital output port P4 is a port which outputs a digital signal. The analog input port P1 is connected to the output terminal of the main sensor 10. The programmable analog I/O port P2 is connected at a point between the protective resistor 110 and the comparing circuit 12. The programmable analog I/O port P2 is connected to the non-inverting input terminal of the comparator 121. In other, word, the programmable analog I/O port P2 is connected to a point which in located on a side of the protective resistor 110 closer to the comparing circuit 12. The digital input port P3 is connected to the output terminal of the comparator 121. The digital output port P4 is connected to an initiating circuit of a safety device on a vehicle, such as a air bag device. The microcomputer 13 may be provided by a single packaged microcomputer available in the market. The programmable analog I/O port P2 may be provided as a programmable analog I/O pin on the package.

In FIG. 1, the electronic safing system 1 is activated by turning on a power source and starts operation. The electronic safing system 1 first performs a diagnosis for the comparing circuit 12 during a predetermined time period, several seconds, just after the turning on of the power source. For this purpose, the microcomputer 13 includes a program for performing the diagnosis for the comparing circuit 12.

The electronic safing system 1 inhibits a initiating function of the safety device during the diagnosis. For this purpose, the microcomputer 13 includes inhibiting means for inhibiting an initiating function of the safety device.

The microcomputer 13 switches the programmable analog I/O port P2 to the analog output ports. The microcomputer 13 outputs a high level voltage from the programmable analog I/O port P2. The high level voltage is 5V which is higher than the reference voltage supplied by the voltage dividing circuit 120. The high level voltage imitates the voltage signal of the safing sensor 11 which indicates that a collision occurs. For this purpose, the microcomputer 13 provides means for switching the programmable analog I/O port P2 to the analog output port, and means for outputting collision imitating signal from the programmable analog I/O port P2. The high level voltage is inputted into the non-inverting input terminal of the comparator 121. Although the high level voltage is also applied to the output terminal of the safing sensor 11 at this time, since the protective resistor 110 exists, a leaking current is sufficiently suppressed. In a case that the comparator 121 is in a normal condition and functions properly, the comparator 121 outputs a high level signal from the output terminal. The microcomputer 13 monitors the output signal from the comparator 121, and determines whether the comparator 121 outputs an expected signal. In this embodiment, the microcomputer 13 determines that the comparing circuit 12 is functioning properly when the comparator 121 outputs the high level signal when the imitating signal is supplied from the programmable analog I/O port P2. On the other hand, in a case that the comparator 121 does not output the high level signal, the microcomputer determines that the comparing circuit 12 is in a malfunction. For this purpose, the microcomputer 13 provides means for monitoring the output of the comparing circuit 12, i.e., the comparator 121. The microcomputer 13 further provides means for determining whether the output is an expected signal or not when supplying an imitating signal from the programmable analog I/O port P2. In other word, the microcomputer provides means for determining whether the comparing circuit is properly functioning or not based on the output of the comparing circuit during the imitating signal is supplied from the programmable analog I/O port P2. The comparator 121 is made of a custom specification. The comparator 121 is configured to saturate the output of the comparator 121 to a low level, when at least one of the resistors 120a and 120b in the voltage dividing circuit 120 gets a short-circuit failure or an open-circuit failure. In a common comparator, level of the output is not guaranteed, when the input of a comparator becomes a level of the source voltage or a level of the ground. Therefore, the microcomputer 13 can detect the malfunction of the comparing circuit 12 including the short-circuit failure and the open-circuit failure by determining whether the output is the high level or not. If the microcomputer 13 determines that the comparing circuit 12 is in an abnormal condition, the microcomputer 13 reports the abnormality by turning on a warning lamp on an instrument panel of the vehicle. For this purpose, the microcomputer 13 provides means for performing fail protection procedure, such as reporting a failure to a driver, or restricting a function of the safety device.

If the microcomputer 13 determines that the comparing circuit 12 is in a normal condition, the microcomputer 13 switches the programmable analog I/O port P2 to the usual analog input port. For this purpose, the microcomputer 13 provides means for switching the programmable analog I/O port P2 to the analog input port. Then, microcomputer 13 performs a predetermined function for detecting a collision of the vehicle. The microcomputer 13 inputs the following three signals: the output voltage of the main sensor 10 inputted via the analog input port P1, the output voltage of the safing sensor 11 inputted via the programmable analog I/O port P2, and the output of the comparator 121 inputted via the digital input port P3. The microcomputer 13 detects a collision, if two of three or all three signals reach to levels indicative of a collision. For this purpose, the microcomputer 13 provides means for determining a collision based on at least a signal inputted via the programmable analog I/O port P2. The microcomputer 13 also provides means for determining a collision based on the analog signal inputted via the programmable analog I/O port P2 and the digital signal inputted via the digital input port P3. The microcomputer 13 also provides means for determining a collision based on the analog signal inputted via the programmable analog I/O port P2, the digital signal inputted via the digital input port P3, and the analog signal inputted via the analog input port P1. Then, if a collision is determined, the microcomputer 13 outputs the initiating signal to the initiating circuit of the safety device from the digital output port P4. The safety device performs an occupant protecting measure, such as deploying an air bag. For this purpose, the microcomputer 13 provides means for initiating an occupant protecting measure in response to a determination of a collision.

According to the embodiment, the microcomputer 13 diagnoses the comparing circuit 12 by switching the programmable analog I/O port P2 to an analog output port, and outputs the predetermined voltage for diagnosis from the programmable analog I/O port P2. In addition, the programmable analog I/O port P2 switched to the analog output port in a diagnosis period is directly connected to a signal line between the safing sensor 11 and the input terminal of the comparing circuit 12. The programmable analog I/O port P2 is used to input an analog voltage from the safing sensor 11 when the microcomputer 13 is functioning as a collision detecting device. The programmable analog I/O port P2 is used for both input and output purpose. The programmable analog I/O port P2 is used for both the diagnosis purpose and the collision detecting purpose. The microcomputer 13 can performs a diagnosis for the comparing circuit 12 based on the output of the comparing circuit 12. Therefore, the electronic safing system 1 is provided without additional circuit component for generating the predetermined voltage signal for diagnosis. As a result, it is possible to reduce cost.

The comparing circuit 12 includes a voltage dividing circuit 120 and a comparator 121. Therefore, it is possible to set the reference voltage and perform the comparing function in a reliable manner.

According to the embodiment, the inverting input terminal of the comparator 121 is connected to the series connection point of the resistors 120a and 120b. The non-inverting input terminal of the comparator 121 which provides the input terminal of the comparing circuit 12 is connected to the microcomputer 13 and the output terminal of the safing sensor 11. The output terminal of the comparator 121 which provides the output terminal of the comparing circuit 12 is connected to the microcomputer 13. This configuration provides a reliable circuit and function.

According to the embodiment, the microcomputer 13 diagnoses both the voltage dividing circuit 120 and the comparator 121 based on the output of the comparator 121. The microcomputer 13 is installed with a program for performing a step of performing a diagnosis for both the voltage dividing circuit 120 and the comparator 121. In this step, the diagnosis is performed based on the output of the comparator 121 during the predetermined voltage is applied from the programmable I/O port P2. If an expected output is not obtained from the comparator 121 when the predetermined voltage is applied from the programmable I/O port p2, the step performed by the microcomputer 13 determines that the circuit including the voltage dividing circuit 120 and the comparator 121 is in trouble. For this purpose, the microcomputer 13 provides means for performing a diagnosis based on the output of the comparator 121. If any trouble or malfunctioning is detected in the diagnosis, the microcomputer 13 performs a predetermined procedure, such as a fail safe procedure. The comparing circuit 12 can be diagnosed certainly. Alternatively, the microcomputer 13 may be programmed to perform a diagnosis for at least one of the voltage dividing circuit 120 and the comparator 121 based on the output of the comparator 121. In this case, the microcomputer 13 includes a program for performing a step for performing a diagnosis for at least one of the voltage dividing circuit 120 and the comparator 121 based on the output of the comparator 121 during the predetermined voltage is applied from the programmable port P2. The microcomputer 13 may be programmed to perform a diagnosis for only one of the voltage dividing circuit or the comparator based on the output of the comparator.

According to this embodiment, the output terminal of the safing sensor 11 is connected to the non-inverting input terminal of the comparator 121 via the protective resistor 110. Therefore, it is possible to suppress a leaking current to the safing sensor 11 when supplying the voltage from the programmable analog I/O port P2.

In the embodiment, the inverting input terminal of the comparator 121 is connected to the voltage dividing circuit 120, and the non-inverting input terminal is connected to the safing sensor 11 and the microcomputer 13. However, the arrangement of the comparing circuit is not limited to the illustrated embodiment. For example, the comparing circuit may be provided in an inversed configuration. The non-inverting input terminal of the comparator 121 may be connected to the voltage dividing circuit, and the inverting input terminal may be connected to the safing sensor 11 and the microcomputer 13. This configuration is illustrated in FIG. 1 by parentheses. In this case, the same result can be acquired by setting the microcomputer appropriately, for example, the voltage outputted when diagnosing, the logic for diagnosing, and the logic for determining a collision shall be inversed or adjusted.

In the embodiment, the acceleration is explained as a physical quantity indicative of a collision. However, the physical quantity indicative of a collision is not limited to the above. For example, the sensor may detect the physical quantity indicative of a collision other than the acceleration. The sensor may detect a physical quantity which varies in response to a collision. In the embodiment, both the main sensor 10 and the safing sensor 11 detect the acceleration in the same way. However, the sensors 10 and 11 may be different sensors which detect the acceleration in different ways.

In the embodiment, the voltage dividing circuit 120 includes two resistors 120a and 120b connected in series. However, the voltage dividing circuit 120 is not limited to the above. The voltage dividing circuit 120 may be provided by three or more resistors connected in series. In this case, the comparator may be connected to either one of the series connection points for supplying the reference voltage.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An electronic safing system, comprising:
   a safing sensor which detects a physical quantity responsive to a collision and outputs a voltage according to a detected result;
   a comparing circuit including a voltage dividing circuit and a comparator, wherein the voltage dividing circuit sets a reference voltage and is provided by a plurality of resistors connected in a series circuit, which has an end connected to a power source and another end connected to a ground, and wherein the comparator compares the voltage output from the safing sensor with the reference voltage set by the voltage dividing circuit, and outputs a signal according to a comparison result; and
   a microcomputer which determines, based on the voltage output from the safing sensor and the signal output from the comparing circuit, whether a collision occurs,
   wherein the safing sensor has an output terminal, which is connected to an input terminal of the comparing circuit;
   wherein the microcomputer has an A/D port, which is connected to the input terminal of the comparing circuit and the output terminal of the safing sensor, and is settable an input and an output in a selectable manner according to an internal register;
   wherein the microcomputer sets the A/D port settable the input and the output to be an output port, and outputs a predetermined voltage for a diagnosis from the A/D port settable the input and the output, when the comparing circuit is diagnosed;
   wherein the microcomputer diagnoses the comparing circuit according to the signal output from the comparing circuit; and
   wherein the microcomputer switches the A/D port settable the input and the output to be an input port, and inputs the voltage output from the safing sensor, when the microcomputer determines in the diagnosis that the comparing circuit is in a normal condition.

2. The electronic safing system according to claim 1, wherein the predetermined voltage for the diagnosis to be output from the A/D port is higher than the reference voltage set by the voltage dividing circuit.

3. The electronic safing system according to claim 1, wherein the comparator is configured to saturate the signal output from the comparator to a low level when the dividing resistor in the voltage dividing circuit gets a short-circuit failure or an open-circuit failure.

4. The electronic safing system according to claim 1, wherein the comparator includes:

an inverting input terminal connected to one of a plurality of series connection points of the plurality of dividing resistors for providing the voltage dividing circuit;

a non-inverting input terminal providing the input terminal of the comparing circuit; and an output terminal providing an output terminal of the comparing circuit.

5. The electronic safing system according to claim 1, wherein the comparator includes:

a non-inverting input terminal connected to one of a plurality of series connection points of the plurality of dividing resistors for providing the voltage dividing circuit;

an inverting input terminal providing the input terminal of the comparing circuit; and an output terminal providing an output terminal of the comparing circuit.

6. The electronic safing system according to claim 1, wherein the microcomputer performs the diagnosis for at least one of the voltage dividing circuit and the comparator based on the signal output from the comparator.

7. The electronic safing system according to claim 1, wherein the output terminal of the safing sensor is connected to the input terminal of the comparing circuit via a protective resistor, and wherein the A/D port settable the input and the output in the microcomputer is connected to an end of the protective resistor on a comparing circuit side.

8. The electronic safing system according to claims 1, wherein the electronic safing system is mounted on a vehicle, detects a collision of the vehicle, and outputs an initiating signal to an initiating circuit of a passenger safety device in response to a detection result.

* * * * *